Aug. 1, 1961  J. M. GARNETT, JR  2,994,551
BORING BAR MOVER
Filed June 24, 1958
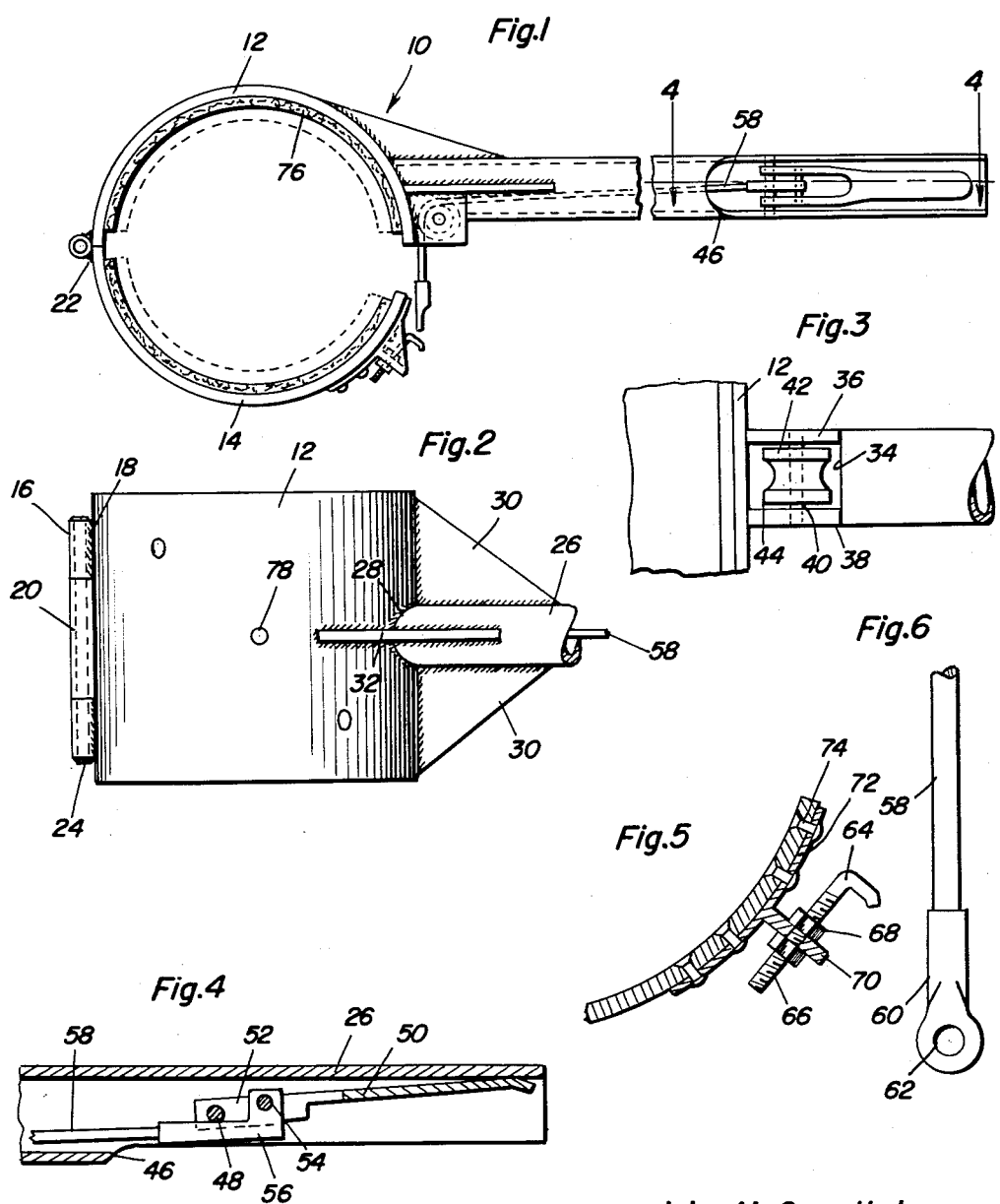
John M. Garnett, Jr.
INVENTOR.

United States Patent Office 2,994,551
Patented Aug. 1, 1961

2,994,551
BORING BAR MOVER
John M. Garnett, Jr., 2250 Bunker Hill Woods Road, Oxford, Ohio
Filed June 24, 1958, Ser. No. 744,187
2 Claims. (Cl. 294—15)

The present invention generally relates to a device for moving a boring bar and more particularly to an attachment for engagement with a boring bar for movement of the boring bar in a longitudinal direction without damage to any part of the boring bar and including in its construction means for quickly and easily attaching the device to a boring bar and removing the same therefrom so that the boring bar may be used in the usual manner together with elongated handle means by which thrust may be applied to the boring bar for moving the same in and out of backstands and jigs.

In the use of conventional boring bars, it frequently occurs that the boring bar has to be moved into or out of the backstand or jig and in accomplishing this, various randomly selected tools are engaged with the tool slot in the boring bar for exerting pressure thereon for moving the boring bar longitudinally. This action quite often causes damage to the tool slot such that the surfaces of the tool slot have to be filed smooth for receiving the tool shank which requires a great deal of time. Also, tools of this nature quite often slip out of the tool slot accidentally and cause injury to the person moving the boring bar. Accordingly, it is the primary object of the present invention to provide a moving device for boring bars which is temporarily attached to the boring bar during movement thereof and then released.

Another object of the present invention is to provide a boring bar mover having cushioned clamp elements for preventing the marring of the external surface of the boring bar.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a plan view of the boring bar mover of the present invention;

FIGURE 2 is a partial side elevation of the boring bar mover;

FIGURE 3 is a detailed side elevation of a portion of the boring bar mover;

FIGURE 4 is a detailed sectional view taken substantially upon a plane passing along section line 4—4 of FIGURE 1;

FIGURE 5 is a detailed sectional view illustrating the adjustable construction of the hook part of the operating mechanism for the boring bar mover;

FIGURE 6 is an elevation of the free end of the operating cable illustrating the construction of the eye member for engagement over the hook in FIGURE 5.

Referring now specifically to the drawings, the numeral 10 generally designates the boring bar mover of the present invention constituted by a pair of substantially semi-cylindrical clamp elements designated by the numerals 12 and 14. The clamp element 12 is provided with a pair of vertically aligned hinge barrels 16 attached thereto as by welding 18 while the clamp element 14 is provided with a central hinge barrel 20 secured thereto as by welding 22. A hinge pin 24 is inserted through the aligned hinged barrels 16 and 20 thus hingedly connecting the clamp elements 12 and 14 together at one end thereof.

The other end of the clamp element 12 is provided with a laterally extending pipe 26 welded thereto as indicated by the numeral 28. The pipe 26 is elongated and is rigidly connected with the clamp element 12 by upper and lower vertical gussets 30 and a central horizontal gusset 32 thus rigidifying the structure to such an extent that the handle defined by the tubular member 26 will have very little flexure when force is exerted on the elongated tubular member 26 for movement of the clamp elements 12 and 14 in a direction parallel with the longitudinal axis thereof.

The inner end of the tubular member 26 opposite from the side having the gusset plate 32 is provided with an enlarged opening 34 having upper and lower spaced pivot lugs 36 receiving a pin or shaft 40 which rotatably journals a roller 42 thereon with the roller 42 having a peripheral concave surface 44 which forms a guide for cable or other flexible element passing over the roller 42.

The outer end of the tubular member is provided with an upwardly facing slot 46 which removes a portion of the tubular member but leaves the major portion thereof intact for receiving a vertical pivot pin 48 which pivotally supports an elongated handle 50 having a bifurcated inner end with the furcations being designated by the numeral 52. The furcations 52 are interconnected by a transverse pin 54 having a substantially L-shaped connector 56 pivotally connected thereto with the L-shaped connector 56 also being connected with a flexible cable 58 which extends inwardly through the tubular member 26 and passes over the roller 42 and terminates in an adapter 60 having an eye 62 therein for engagement with a substantially L-shaped or hook-shaped member 64 having an externally threaded elongated shank 66 receiving a pair of adjustment nuts 68. The shank of the hook-shaped member 64 extends through a radially projecting lug 70 on a mounting plate 72 which is held onto the member 14 as by fastening rivets 74. The clamp nuts 68 permit longitudinal adjustment of the threaded shank 66 in relation to the member 14 so that the device may be used on different size boring bars. Also, the handle member 50 is such that the pivot pin 54 shifts over the center of the pivotal movement of the lever or handle 50 thus providing an arrangement in which tightening of the clamp elements 12 and 14 is effected through the flexible cable 58 which passes over the roller 42 and thence is engaged with the hook-shaped connector 64.

Mounted on the inner surface of each of the clamp elements 12 and 14 is a thickness of cushioning material which may be of any desired thickness depending upon the particular size of the boring bar with there being provided countersunk fasteners 78 securing the cushioning material 76 in position. As shown in FIGURE 1, the cushioning material may be altered so that the device of the present invention may be attached to different size boring bars in a rigid and effective manner without any damage being done to the smooth external surface of the boring bar.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A boring bar mover comprising a pair of substantially semi-cylindrical rigid clamping elements hingedly interconnected at one edge, an elongated handle rigid with one of said clamp elements in diametric opposition to the hingedly connected edge and extending laterally and rigidly from the clamp element, means mounted adjacent the outer end of said elongated handle and connected with the free edge of the other clamping element for pulling the free edge of the other clamping elements towards the handle for gripping a boring bar extending between the clamping elements, each of said clamping elements being provided with a cushion on the inner surface thereof for preventing metal to metal engagement with the boring bar for preventing marring of the surface of the boring bar, said means including a hook-shaped member, means adjustably mounting the hook-shaped member on the free edge of the other clamping element, an eye member releasably engaged with the hook, a flexible line attached to the eye member, a pulley rotatably mounted on the inner end of the handle, said line extending under the pulley and extending longitudinally along the handle, and an over-center tensioning device interconnecting the handle and line for tensioning the line and pulling the free edge of the other clamping element towards the first clamping element, said handle being tubular with the flexible line extending longitudinally within the tubular handle thus preventing entanglement of the line with external objects, said tensioning device including a handle member pivotally mounted on the handle adjacent the outer end thereof, said tubular handle having a cut away portion adjacent the outer end extending beyond the pivotal connection between the handle member and the handle for facilitating swinging movement of the handle member about its pivot axis, means connecting the line to the handle member for movement of the connection between the line and the handle member about an arc defined by the pivotal connection between the handle and handle member, the point of attachment between the line and the handle member being disposed on the opposite side of the pivotal connection between the handle and handle member from the major portion of the line, said means including a generally L-shaped member with the shorter leg thereof being connected with the handle member thus forming an offset for the line as it passes over the pivotal connection between the handle member and handle thus enabling the handle member to move the connection between the line and handle member over the center of the line of force exerted by the flexible line.

2. For use in combination with a boring bar having a smooth exterior surface and a tool slot therein normally receiving randomly selected tools for moving the boring bar longitudinally in relation to backstands and jigs, a temporary attachment for mounting on the boring bar for movement thereof longitudinally in relation to a backstand or jig and being quickly and easily attached and detached from the boring bar so that it will not interfere with the normal operation of the bar, said attachment comprising a pair of substantially semi-cylindrical rigid clamping elements hingedly interconnected at one edge, an elongated handle rigid with one of said clamping elements in diametric opposition to the hingedly connected edge and extending laterally therefrom in substantially parallel relation to a radial line extending from the center of the clamping elements past the free edge of said one clamping element, said handle being rigid with said one clamping element, each of said clamping elements being provided with a semi-cylindrical cushion on the inner face thereof which extends substantially throughout the vertical length of the clamping elements for preventing metal to metal engagement between the clamping elements and the boring bar thereby preventing marring of the surface of the boring bar, the other of said clamping elements having a laterally extending lug adjacent the free end thereof, an L-shaped member extending through the lug, means adjustably securing the L-shaped member on the lug, said L-shaped member including a laterally extending hook-shaped end disposed adjacent the free edge of the other clamping element, a pulley mounted on said handle adjacent the inner end thereof for rotation about an axis parallel to the longitudinal axis of the semi-cylindrical members, a flexible line extending between the pulley and the handle, an eye member mounted on one end of said flexible line for detachable engagement with the hook-shaped end of the L-shaped member, said handle being tubular with a portion of the periphery of the pulley being in alignment with the interior of the handle, said flexible line extending longitudinally within the confines of the handle, the outer end of the handle being provided with a cut-away portion, a handle member pivotally mounted on said elongated handle in the cut-away portion intermediate the ends thereof for pivotal movement about an axis perpendicular to the axis of rotation of the pulley, means on the other end of the line pivotally connecting the line to the handle member in spaced relation to the pivotal connection between the handle member and the handle for moving the line longitudinally upon pivotal movement of the handle member in relation to the handle, the connection between the line and the handle member including an L-shaped member having an offset end portion forming a connection with the handle member on the side of the pivotal connection between the handle member and handle toward the free end of the handle whereby the offset connection will enable the flexible line to be disposed in substantially straight condition and enabling the pivotal connection between the line and the handle member to move past the center of pivotal movement of the handle member in relation to the handle for locking the handle member in position with the flexible line moved longitudinally outwardly of the handle for forcing the clamping elements inwardly and retaining them in clamped position.

References Cited in the file of this patent

UNITED STATES PATENTS

| | | |
|---|---|---|
| 1,103,717 | Walton et al. | July 14, 1914 |
| 1,407,238 | Twiss | Feb. 21, 1922 |
| 1,547,565 | Duda | July 28, 1925 |
| 1,618,653 | Greve | Feb. 22, 1927 |
| 1,620,272 | May | Mar. 8, 1927 |
| 1,643,688 | Wilson | Sept. 27, 1927 |
| 1,864,864 | Smith | Jan. 28, 1932 |
| 2,001,346 | Hays | May 14, 1935 |
| 2,264,775 | Spang | Dec. 2, 1941 |
| 2,674,966 | Morris | Apr. 13, 1954 |
| 2,819,111 | Cozzens | Jan. 7, 1958 |